United States Patent
Chung et al.

(10) Patent No.: US 11,722,020 B2
(45) Date of Patent: Aug. 8, 2023

(54) STATOR OF A BRUSHLESS MOTOR

(71) Applicant: Techway Industrial Co., Ltd., Taichung (TW)

(72) Inventors: Fu Hsiang Chung, Taichung (TW); Hong Fang Chen, Taichung (TW); Shih Wei Hung, Taichung (TW); Wei Ting Chen, Taichung (TW); Yu Chin Lin, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 221 days.

(21) Appl. No.: 17/240,174

(22) Filed: Apr. 26, 2021

(65) Prior Publication Data

US 2021/0351637 A1 Nov. 11, 2021

(30) Foreign Application Priority Data

May 5, 2020 (TW) ................................. 109114913

(51) Int. Cl.
*H02K 1/14* (2006.01)
*H02K 3/28* (2006.01)
(Continued)

(52) U.S. Cl.
CPC ............. *H02K 1/146* (2013.01); *H02K 3/28* (2013.01); *H02K 3/38* (2013.01); *H02K 3/522* (2013.01);
(Continued)

(58) Field of Classification Search
CPC ... H02K 3/28; H02K 2203/06; H02K 2203/12
See application file for complete search history.

(56) References Cited

U.S. PATENT DOCUMENTS 6,600,244 B2   7/2003   Okazaki et al.
7,626,303 B2 * 12/2009   Watanabe ............. H02K 3/522
                                                          310/194
(Continued)

FOREIGN PATENT DOCUMENTS

CN   105580248 A   5/2016
CN   106104979 A   11/2016
(Continued)

OTHER PUBLICATIONS

Csoti et al., DE-102017216075-A1 machine translations (Year: 2019).*

*Primary Examiner* — Quyen P Leung
*Assistant Examiner* — Minki Chang
(74) *Attorney, Agent, or Firm* — Alan D. Kamrath; Karin L. Williams; Mayer & Williams PC

(57) ABSTRACT

A stator of a brushless motor has an iron core, a bobbin, and a winding assembly. The iron core has multiple stator poles mounted on an interior annular surface of a core body and spaced apart from each other. The bobbin is mounted on one of two open ends of the core body and has a substrate, at least one neutral connector mounted on an upper surface of the substrate, and at least one neutral solder pad mounted in the at least one neutral connector. The winding assembly is formed by one wire wound on multiple stator poles and the connectors. The winding assembly is electrically connected to the at least one neutral solder pad.

13 Claims, 9 Drawing Sheets

(51) Int. Cl.
  *H02K 3/38* (2006.01)
  *H02K 3/52* (2006.01)
  *H02K 15/00* (2006.01)
  *H02K 5/22* (2006.01)

(52) U.S. Cl.
  CPC ......... *H02K 5/225* (2013.01); *H02K 15/0062* (2013.01); *H02K 15/0068* (2013.01); *H02K 2203/06* (2013.01); *H02K 2203/09* (2013.01); *H02K 2203/12* (2013.01)

(56) References Cited

U.S. PATENT DOCUMENTS

| | | | |
|---|---|---|---|
| 8,288,903 B2 * | 10/2012 | Matsuda | H02K 3/522 310/43 |
| 10,181,762 B2 | 1/2019 | Suzuki | |
| 10,615,656 B2 | 4/2020 | Haga et al. | |
| 2016/0218578 A1 | 7/2016 | Yamada et al. | |
| 2019/0319506 A1 * | 10/2019 | Reu | H02K 3/522 |

FOREIGN PATENT DOCUMENTS

| | | | |
|---|---|---|---|
| CN | 110022020 A | 7/2019 | |
| DE | 102017216075 A1 * | 3/2019 | ......... H02K 15/0068 |

* cited by examiner

STATOR OF A BRUSHLESS MOTOR

CROSS REFERENCE TO RELATED APPLICATIONS

The present application claims priority to Taiwan application No. 109114913, filed on May 5, 2020, the content of which is hereby incorporated by reference in its entirety.

BACKGROUND OF THE INVENTION

1. Field of the Invention

The present invention relates generally to a stator of a brushless motor, and more particularly to a wiring structure of the stator of the brushless motor.

2. Description of Related Art

A conventional structure of a motor may comprise a rotor and a stator. The rotor is mounted in the stator. Multiple permanent magnets may be mounted on the rotor. Multiple coils may be mounted on an interior annular surface of the stator. When electricity is supplied to the coils, changing magnetic field is induced to interact with the permanent magnets on the rotor, such that the rotor may be driven to rotate accordingly. The conventional motor has simple structure and low cost and is easy to operate. Therefore, the conventional motor is widely used.

In general, the approach to supply the electricity to the conventional motor is to input a three-phase (U, V, and W) alternating current electrical power to the coils wound on an iron core through a wire-bonding plate. A changing magnetic field may be induced to drive the rotor to rotate.

The coils may have neutral points. However, in order to set the neutral points on the conventional motor, a neutral ring is adopted to be mounted on the wire-bonding plate. The neutral points of the coils are connected to the neutral ring by spot-soldering. Human workers have to manually solder the neutral points of the coils on the neutral ring one by one, wasting a lot of labor and time. Besides, when soldering, the human workers may make mistakes or even incompletely solder the neutral point to the neutral ring. The conventional motor with defects may have latent hazard during operation.

SUMMARY OF THE INVENTION

An objective of the present invention is to provide a stator of a brushless motor with a neutral solder pad and a winding assembly by a one-wire winding approach. The stator of the present invention can be manufactured completely by automation. Besides, the efficiency and the yield of manufacturing the stator of the present invention can be promoted.

The stator of the brushless motor of the present invention comprises an iron core, a bobbin, and a winding assembly. The iron core comprises a core body and multiple stator poles. The core body has two open ends opposite to each other, and an exterior annular surface and an interior annular surface opposite to each other. The multiple stator poles are mounted on the interior annular surface of the core body and spaced apart from each other. The bobbin is mounted on one of the open ends of the core body and comprises a substrate, multiple pole covers, at least three solder-pad connectors, at least one neutral connector, at least three magnetic-pole solder pads, and at least one neutral solder pad. The substrate has an upper surface and a lower surface opposite to each other. The multiple pole covers are formed on an inner annular surface of the bobbin. The at least three solder-pad connectors integratedly protrude from the upper surface of the substrate, wherein each one of the solder-pad connectors has a slot. The at least one neutral connector is mounted on the upper surface of the substrate, wherein the at least one neutral connector each has a slot. The at least three magnetic-pole solder pads are respectively mounted in the slots of the solder-pad connectors. The at least one neutral solder pad is mounted in the slot of the at least one neutral connector. The winding assembly comprises at least one coil. The winding assembly is formed by one wire wound on the multiple stator poles and the at least three solder-pad connectors. The winding assembly is electrically connected to the at least three magnetic-pole solder pads and the at least one neutral solder pad.

In the present invention, because the neutral solder pad is mounted in the neutral connector, the winding assembly may be directly electrically connected to the neutral solder pad. The neutral ring as mentioned in the prior art is not adopted in the present invention, such that the manufacturing process of the stator of the present invention is simplified. Besides, the yield of manufacturing the stator of the present invention can be promoted since the defects resulting from manual operation errors on spot-soldering are reduced.

Further, the at least three solder-pad connectors may include a first connector, a second connector, and a third connector. The first connector, the second connector, and the third connector are sequentially and circularly mounted on the upper surface of the substrate.

Further, the neutral connector is mounted beside the third connector.

Further, after the winding assembly is electrically connected to the magnetic-pole solder pad in the first connector, the winding assembly is then wound on one of the stator poles corresponding to one of the pole covers. Then, the winding assembly is wound through a first winding pillar and the neutral connector and then electrically connected to the neutral solder pad. Then, the winding assembly is wound on another stator pole corresponding to another pole cover through a side of the third connector. Then, the winding assembly is wound through the third connector and electrically connected to the magnetic-pole solder pad in the third connector. Then, the winding assembly is wound through the neutral connector and electrically connected to the neutral solder pad. Then, the winding assembly is wound on another stator pole corresponding to another pole cover through a side of the neutral connector. Then, the winding assembly is wound through the second connector and then electrically connected to the magnetic-pole solder pad in the second connector.

The aforementioned winding structure may implement a Y-connection. During winding, the winding assembly can be formed by only one wire that is wound on all of the stator poles, the solder-pad connectors, and the neutral connector, and is electrically connected to the magnetic-pole solder pads and the neutral solder pad. Afterward, the winding assembly is cut off at a third protrusion between the third connector and the neutral connector to complete a wire-cutting procedure. The aforementioned winding process is performed by only one wire and thus is not so complicated. In addition, the winding assembly may directly contact the magnetic-pole solder pads and the neutral solder pad. The manufacturing process of the stator of the present invention is faster and more convenient.

Moreover, each one of the magnetic-pole solder pads and the neutral solder pad can be automatically inserted into the solder-pad connectors and the neutral connector by an automated equipment rather than by human workers manually, so as to save labor and time.

DETAILED DESCRIPTION OF PREFERRED EMBODIMENT(S)

Figure 1:
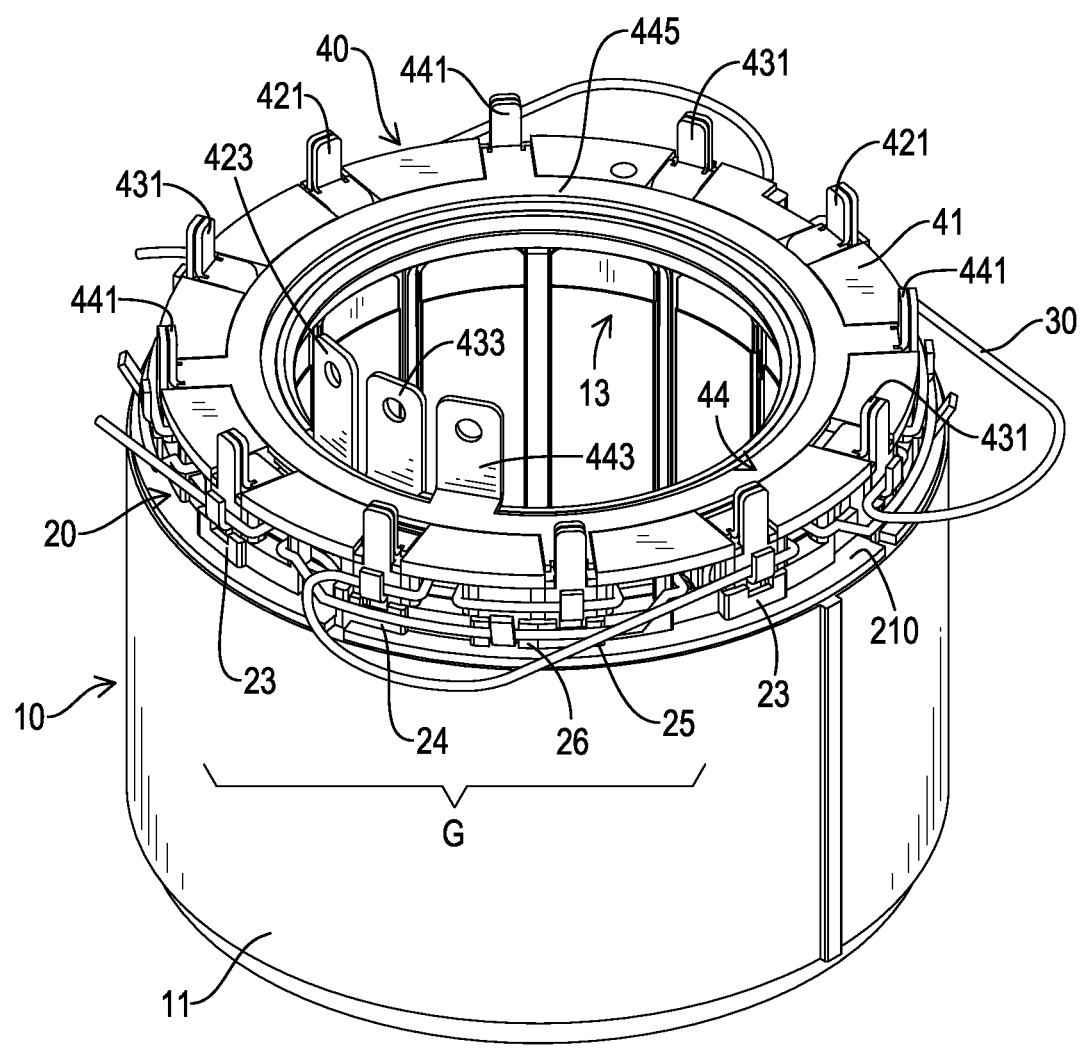
FIG. 1 is a perspective view of an embodiment of the stator of the present invention.
Figure 2:
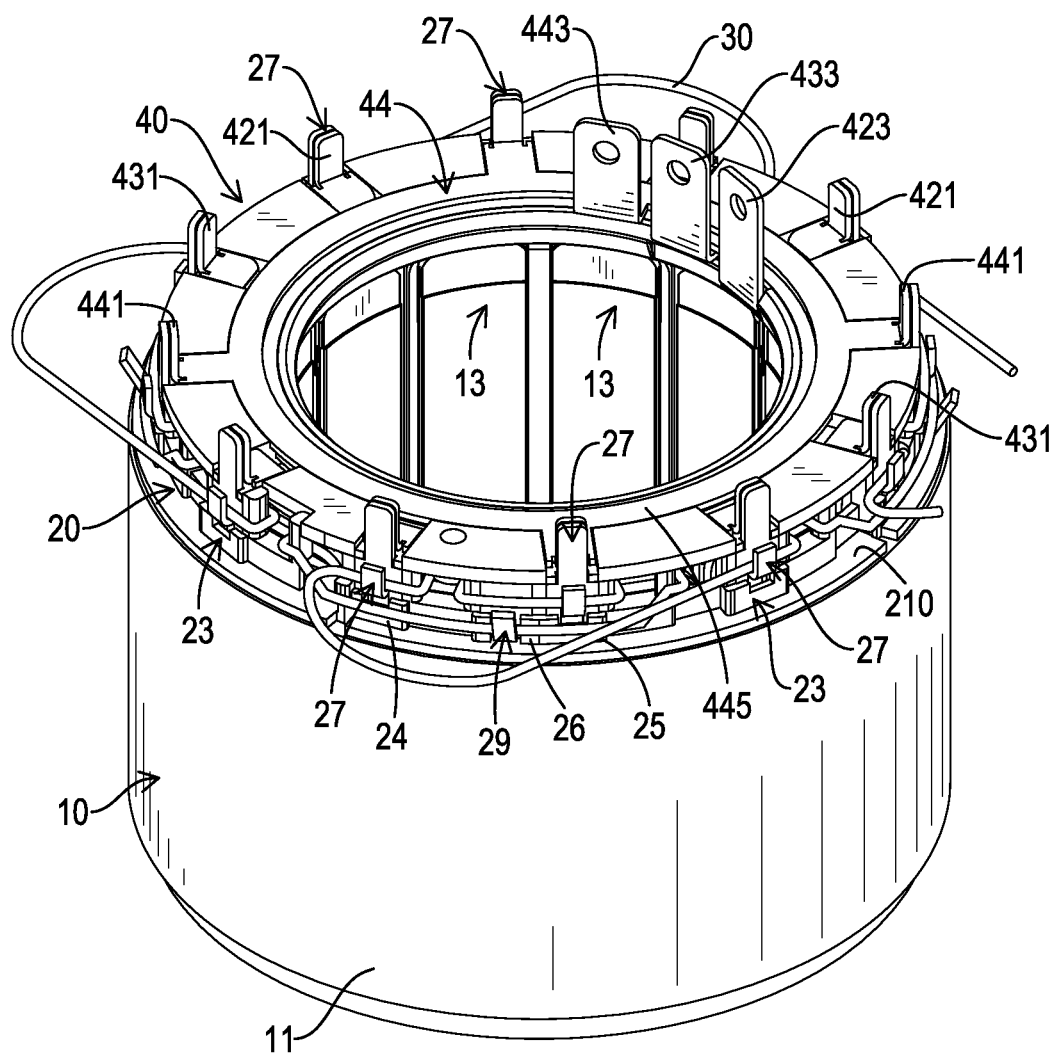
FIG. 2 is another perspective view of the embodiment of the stator of the present invention.

With reference to FIGS. 1 and 2, the present invention discloses a stator of a brushless motor and comprises an iron core 10, a bobbin 20, a winding assembly 30, and a wire-bonding assembly 40.

The iron core 10 comprises a core body 11 and multiple stator poles 13. The core body 11 is a hollow cylinder and has two open ends, an exterior annular surface, and an interior annular surface. Positions of the two ends of the core body 11 are opposite to each other. Positions of the exterior annular surface and the interior annular surface of the core body 11 are opposite to each other. The multiple stator poles 13 are mounted on the interior annular surface of the core body 11 and evenly spaced apart from each other. Each one of the stator poles 13 comprises a tooth portion and a boot portion. The tooth portion may integratedly protrude from the interior annular surface of the core body 11. The boot portion is formed on the tooth portion for the winding assembly 30 to be wound and fixed on the stator pole 13. In an embodiment of the present invention, the core body 11 has twelve stator poles 13, wherein three adjacent stator poles 13 are defined as one pole set and for sequentially indicating a U-phase, a W-phase, and a V-phase of a three-phase AC (Alternating Current) electrical power. Hence, there would be four pole sets in said embodiment of the present invention.

Figure 3:
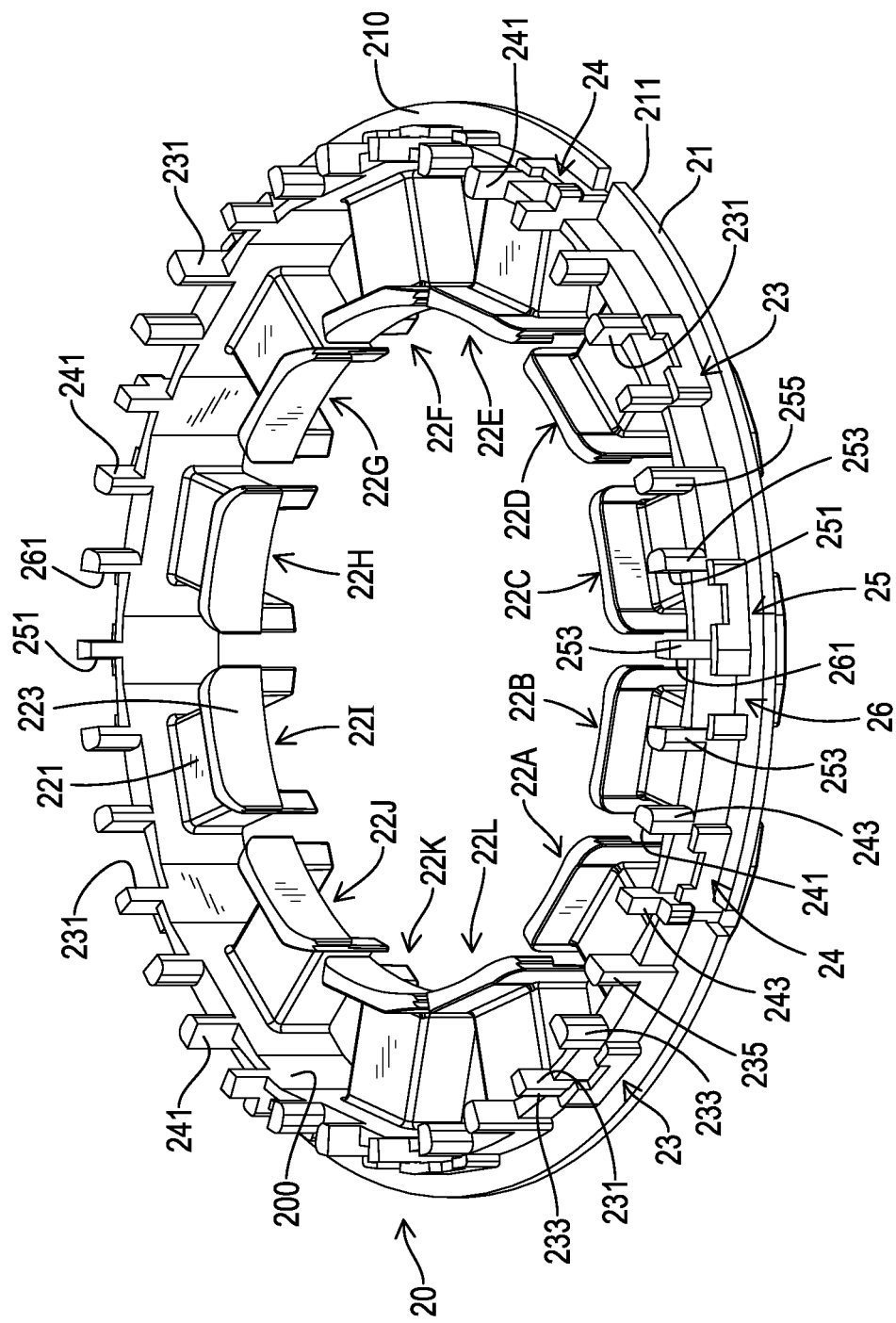
FIG. 3 is a perspective view of the bobbin of the stator of the present invention.

With reference to FIGS. 2 and 3, the bobbin 20 is a ring-shaped rack and mounted on one of the open ends of the core body 11. The bobbin 20 has a substrate 21, multiple pole covers 22A-22L, at least three solder-pad connectors, at least one neutral connector 26, at least three magnetic-pole solder pads 27, and at least one neutral solder pad 29. The at least three solder-pad connectors may comprise multiple first connectors 23, multiple second connectors 24, and multiple third connectors 25. Four connectors, including one of the first connectors 23, one of the second connectors 24, one of the third connectors 25, and one of the at least one neutral connector 26, may be defined as one connector set G for winding. Hence, there would be one or multiple connector sets G in accordance with practical demands. The substrate 21 is shaped as a hollow circle and has an upper surface 210 and a lower surface 211 opposite to each other. The lower surface 211 of the substrate 21 is configured to be embedded in the open end of the core body 11.

With reference to FIG. 3, each one of the pole covers 22A-22L is formed on and integratedly protrudes from an inner annular surface 200 of the bobbin 20. The pole covers 22A-22L are annularly spaced apart from each other on the inner annular surface 200 of the bobbin 20. Each one of the pole covers 22A-22L has a tooth cover portion 221 and a boot cover portion 223. The tooth cover portion 221 is mounted on and radially protrudes from the inner annular surface 200 of the bobbin 20. The boot cover portion 223 is formed on and integratedly protrudes from an end of the tooth cover portion 221. Besides, the boot cover portion 223 extends upwardly. The pole covers 22A-22L respectively and correspondingly cover upper sides of the stator poles 13, wherein the tooth cover portion 221 covers the tooth portion of the stator pole 13, and the boot cover portion 223 covers the boot portion of the stator pole 13.

The first connectors 23, the second connectors 24, and the third connectors 25 are sequentially and circularly mounted on the upper surface 210 of the substrate 21. The neutral connector 26 is mounted on the upper surface 210 of the substrate 21 and beside the third connector 25. As shown in FIGS. 1 and 3, the neutral connector 26 may be disposed between the second connector 24 and the third connector 25.

Each one of the first connectors 23 is formed on and integratedly protrudes from the upper surface 210 of the substrate 21. With reference to FIG. 3, the first connector 23 has a first slot 231, two first protrusions 233, and a first winding pillar 235. The two first protrusions 233 integratedly and upwardly protrude from the upper surface 210 of the substrate 21. The first slot 231 is formed between the two first protrusions 233 and above the upper surface 210 of the substrate 21. The first winding pillar 235 integratedly and upwardly protrudes from the upper surface 210 of the substrate 21 and is spaced apart from one of the two first protrusions 233. In an embodiment of the present invention, there are four first connectors 23.

Each one of the second connectors 24 is formed on and integratedly protrudes from the upper surface 210 of the substrate 21. With reference to FIG. 3, the second connector 24 has a second slot 241 and two second protrusions 243. The two second protrusions 243 integratedly and upwardly protrude from the upper surface 210 of the substrate 21. The second slot 241 is formed between the two second protrusions 243 and above the upper surface 210 of the substrate 21. In an embodiment of the present invention, there are four second connectors 24.

Each one of the third connectors 25 is formed on and integratedly protrudes from the upper surface 210 of the substrate 21. With reference to FIG. 3, the third connector 25 has a third slot 251, three third protrusions 253, and a second winding pillar 255. The three third protrusions 253 are spaced apart from each other and integratedly and upwardly protrudes from the upper surface 210 of the substrate 21. The third slot 251 is formed between two of the third protrusions 253 and above the upper surface 210 of the substrate 21. The second winding pillar 255 is spaced apart from one of the third protrusions 253 that forms the third slot 251. In an embodiment of the present invention, there are four third connectors 25.

Each one of the at least one neutral connector 26 is formed on and integratedly protrudes from the upper surface 210 of the substrate 21. With reference to FIG. 3, the neutral connector 26 has a fourth slot 261. The fourth slot 261 is formed between two of the third protrusions 253, above the upper surface 210 of the substrate 21, and adjacent to the third slot 251. In an embodiment of the present invention, there are four neutral connectors 26.

Figure 4:
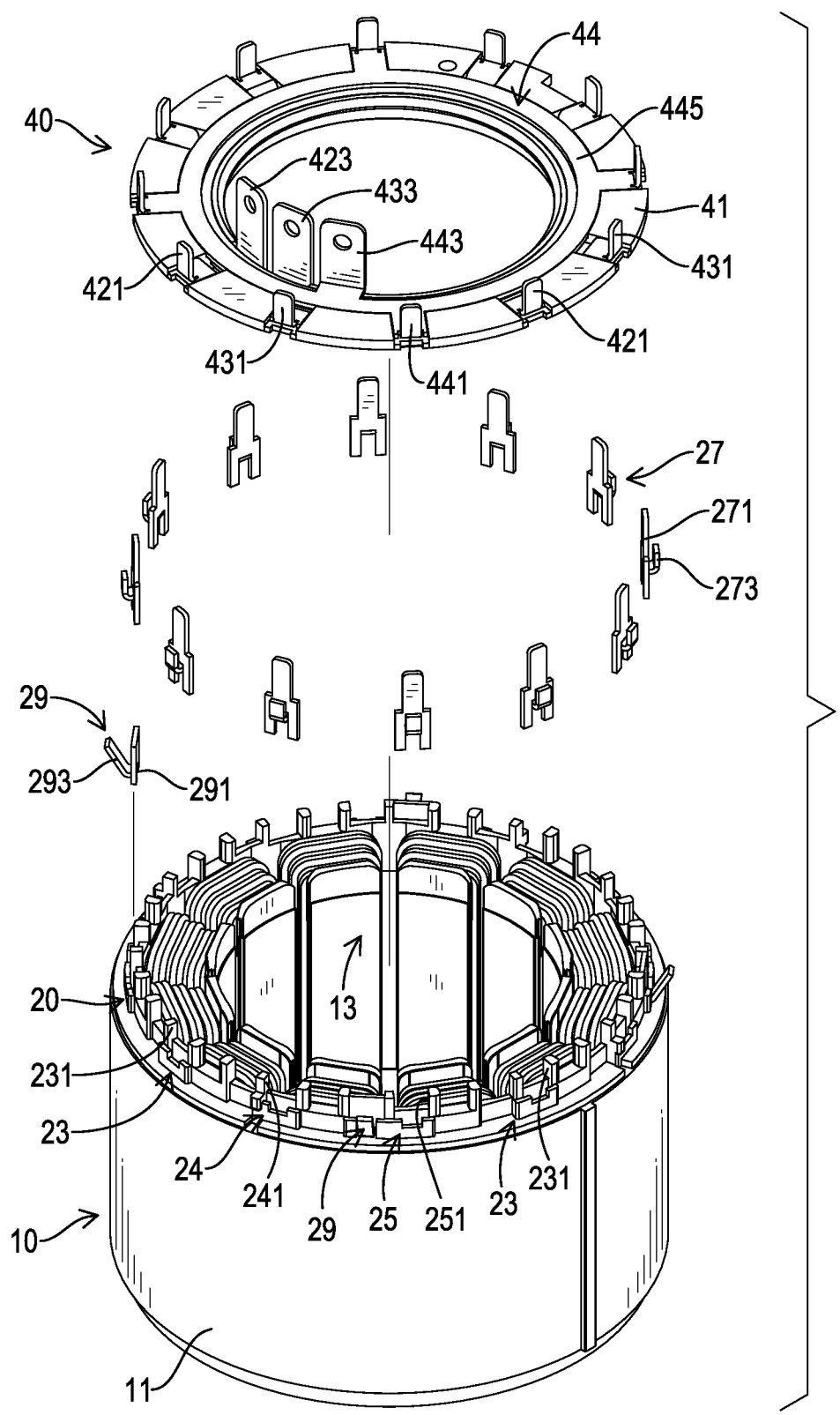
FIG. 4 is an exploded view of the embodiment of the stator of the present invention.

With reference to FIG. 4, each one of the magnetic-pole solder pads 27 is mounted in a respective one of the solder-pad connectors. For example, the magnetic-pole solder pads 27 may be used for spot-soldering. The magnetic-pole solder pads 27 are respectively mounted in the first slots 231 of the first connectors 23, the second slots 241 of the second connectors 24, and the third slots 251 of the third connectors 25. Each one of the magnetic-pole solder pads 27 has a first pad body 271 and a first clamp portion 273. The first clamp portion 273 integratedly and upwardly protrudes from one side (radial outer side) of the first pad body 271 and may be parallel to the first pad body 271. Viewed from the side, the magnetic-pole solder pad 27 is in a "U" shape.

Each one of the at least one neutral solder pad 29 is mounted in the fourth slot 261 of each one of the at least one neutral connector 26. The neutral solder pad 29 may be used for spot-soldering. The neutral solder pad 29 has a second pad body 291 and a second clamp portion 293. The second clamp portion 293 integratedly and upwardly protrudes from one side (radial outer side) of the second pad body 291. Viewed from the side, the neutral solder pad 29 is in a "U" shape With reference to FIG. 5, the winding assembly 30 comprises at least one coil. The winding assembly 30 is wound on the iron core 10 and the bobbin 20. For example, the winding assembly 30 may be connected to one of the magnetic-pole solder pads 27 on the bobbin 20. Afterward, the winding assembly 30 may be sequentially wound on one of the stator poles 13 that corresponds to the U-phase of the AC electrical power. Then, along the bobbin 20, the winding assembly 30 may sequentially contact one neutral solder pad 29, be wound on one of the stator poles 13 that corresponds to the V-phase of the AC electrical power, contact another one of the magnetic-pole solder pads 27, return to contact the same neutral solder pad 29, be wound on one of the stator poles 13 that corresponds to the W-phase of the AC electrical power, and contact still another one of the magnetic-pole solder pads 27, such that a winding structure for one connector set G is completed. In an embodiment of the present invention, after the winding assembly 30 is electrically connected to the magnetic-pole solder pad 27 in the first connector 23, the winding assembly 30 is then wound through one of the first protrusions 233 and then wound on the stator pole 13 corresponding to the pole cover 22A. Then, the winding assembly 30 is sequentially wound through the first winding pillar 235 and the neutral connector 26 and then electrically connected to the neutral solder pad 29. Then, the winding assembly 30 is sequentially wound through the second winding pillar 255 beside the third connector 25 and then wound on the stator pole 13 corresponding to the pole cover 22C. Then, the winding assembly 30 is wound through one of the third protrusions 253 of the third connector 25 and electrically connected to the magnetic-pole solder pad 27 in the third connector 25. Then, the winding assembly 30 is wound through the neutral connector 26 and electrically connected to the neutral solder pad 29. Then, the winding assembly 30 is wound on the stator pole 13 corresponding to the pole cover 22B through the third protrusion 253 that is beside the neutral connector 26. Then, the winding assembly 30 is wound through one of the second protrusions 243 of the second connector 24 and then electrically connected to the magnetic-pole solder pad 27 in the second connector 24, such that the winding structure is completed.

In an embodiment of the present invention, the winding assembly 30 comprises a coil. The coil may be wound on the iron core 10 and the bobbin 20.

Figure 5:
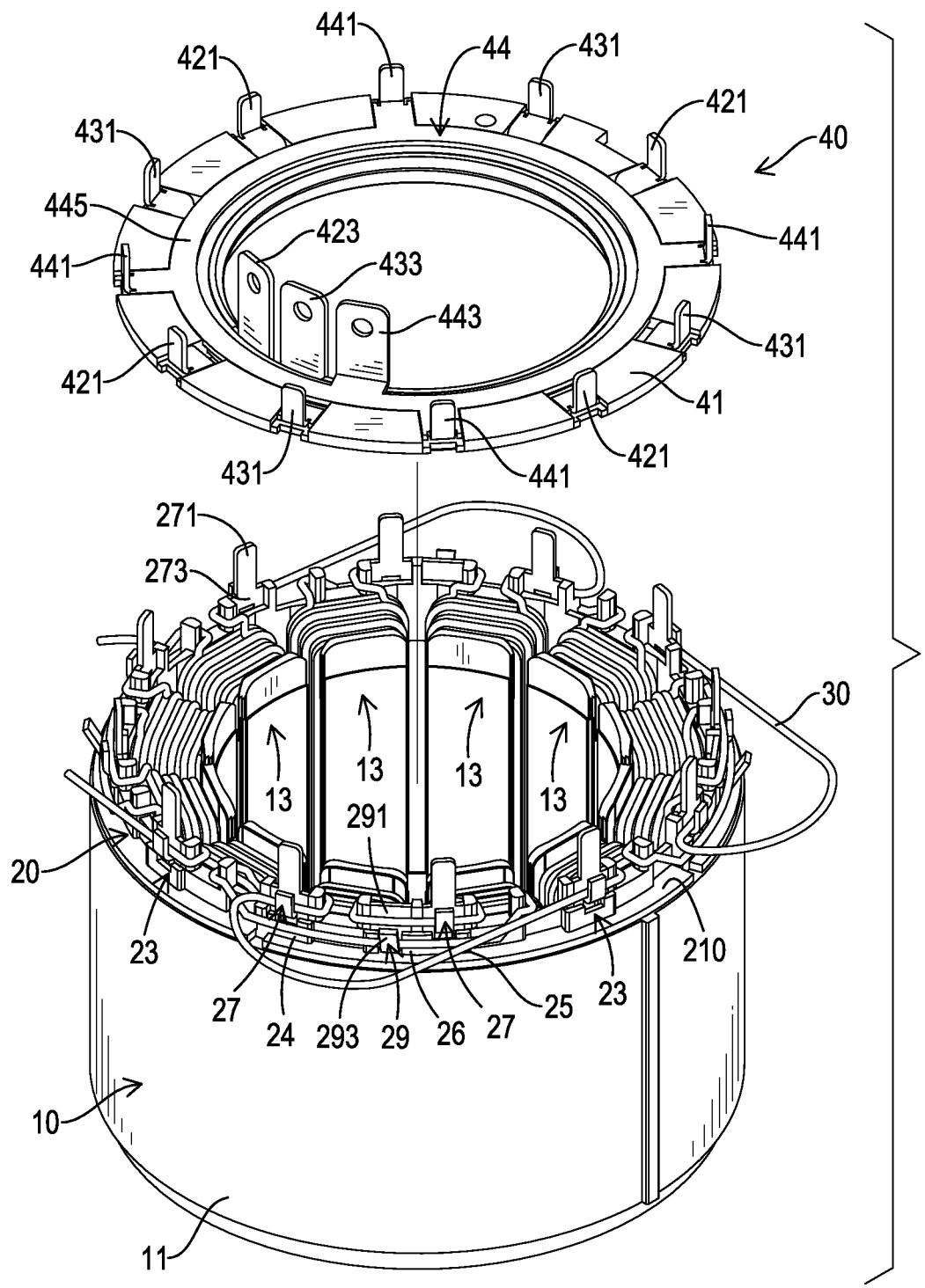
FIG. 5 is an exploded view of FIG. 1.

With reference to FIG. 3 and FIG. 5, a wire-cutting process is performed after the winding structure is completed. For one connector set G, the winding assembly 30 is cut off at the third protrusion 253 between the third connector 25 and the neutral connector 26 to complete a wire-cutting procedure.

In the present invention, there may be more than one connector set G. The present invention may have multiple connector sets arranged beside the aforementioned third connector 25, wherein each connector set has the first connector 23, the second connector 24, the third connector 25, and the neutral connector 26 as mentioned above. Hence, there would be multiple connector sets G on the substrate 21. After the winding assembly 30 is wound based on the aforementioned structure, the winding assembly 30 may be wound through an adjacent first connector 23 and electrically connected to the magnetic-pole solder pad 27 in said first connector 23. It could be deduced that the winding assembly 30 may be wound through the first connector 23, the second connector 24, the third connector 25, and the neutral connector 26 several times. In an embodiment of the present invention, the stator may include four connector sets G.

For each one of the multiple connector sets G, the winding assembly 30 is cut off at the third protrusion 253 between the third connector 25 and the neutral connector 26 to complete a wire-cutting procedure. Hence, multiple wire-cutting procedures would be completed as a whole.

Figure 6:
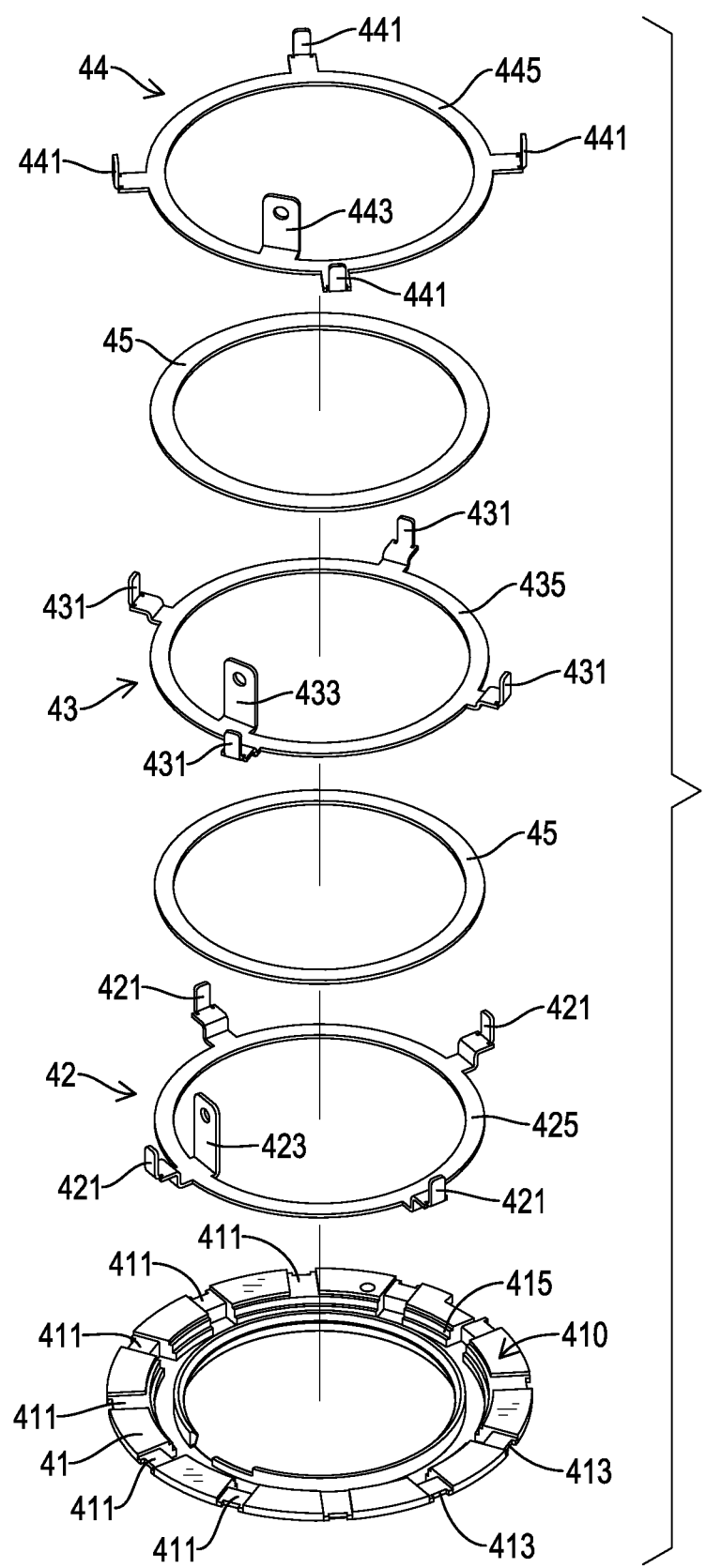
FIG. 6 is an exploded view of a first embodiment of the wire-bonding assembly of the stator of the present invention.

With reference to FIG. 6, when the winding assembly 30 is completely wound, the winding assembly 30 is electrically connected to the wire-bonding assembly 40. In a first embodiment of the wire-bonding assembly 40, the wire-bonding assembly 40 is mounted on the upper surface 210 of the substrate 21 of the bobbin 20. The wire-bonding assembly 40 comprises multiple electrically-conductive rings. Each one of the electrically-conductive rings has an electrically-conductive portion, a power-input portion, and a ring piece. The electrically-conductive portion is mounted on an outer edge of the ring piece. The electrically-conductive portion is electrically connected to one of the magnetic-pole solder pads. The power-input portion is mounted on an inner edge of the ring piece, extends upwardly, and is configured to be electrically connected to one phase of the AC electrical power.

Specifically, the wire-bonding assembly 40 comprises a wire-bonding substrate 41, a first electrically-conductive ring 42, a second electrically-conductive ring 43, a third electrically-conductive ring 44, and multiple electrically-insulated ring pieces 45. The wire-bonding substrate 41 is shaped as a hollow circle and has multiple recesses 411 on an edge area of an upper surface 410 of the wire-bonding substrate 41. Further, multiple notches 413 are formed on a rim of the wire-bonding substrate 41. Positions of the recesses 411 respectively correspond to positions of the notches 413. The recess 411 communicates with the corresponding notch 413.

The first electrically-conductive ring 42 is stacked on the wire-bonding substrate 41 and comprises multiple first electrically-conductive portions 421, a first power-input portion 423, and a first ring piece 425. The multiple first electrically-conductive portions 421 are formed on an outer edge of the first ring piece 425. Each one of the first electrically-conductive portions 421 is in a stepped shape extending upwardly. The first electrically-conductive portions 421 are respectively and electrically connected to the magnetic-pole solder pads 27. Each one of the first electrically-conductive portions 421 is mounted into a respective one of the recesses 411. The first power-input portion 423 is formed on an inner edge of the first ring piece 425 and extends upwardly. The first power-input portion 423 is electrically connected to one phase of the AC electrical power. In an embodiment of the present invention, the first power-input portion 423 may be electrically connected to the U-phase of the AC electrical power.

One of the electrically-insulated ring pieces 45 is stacked on the first electrically-conductive ring 42. The second electrically-conductive ring 43 is stacked on the electrically-insulated ring piece 45. The second electrically-conductive ring 43 comprises multiple second electrically-conductive portions 431, a second power-input portion 433, and a second ring piece 435. The multiple second electrically-conductive portions 431 are formed on an outer edge of the second ring piece 435. Each one of the second electrically-conductive portions 431 is in a stepped shape extending upwardly. The second electrically-conductive portions 431 are respectively and electrically connected to the magnetic-pole solder pads 27. Each one of the second electrically-conductive portions 431 is mounted into a respective one of the recesses 411. The second power-input portion 433 is formed on an inner edge of the second ring piece 435 and extends upwardly. The second power-input portion 433 is electrically connected to one phase of the AC electrical power. In an embodiment of the present invention, the second power-input portion 433 may be electrically connected to the V-phase of the AC electrical power.

Another electrically-insulated ring piece 45 is stacked on the second electrically-conductive ring 43. The third electrically-conductive ring 44 is stacked on said another electrically-insulated ring piece 45. The third electrically-conductive ring 44 comprises multiple third electrically-conductive portions 441, a third power-input portion 443, and a third ring piece 445. The multiple third electrically-conductive portions 441 are formed on an outer edge of the third ring piece 445. Each one of the third electrically-conductive portions 441 is in a stepped shape extending upwardly. The third electrically-conductive portions 441 are respectively and electrically connected to the magnetic-pole solder pads 27. Each one of the third electrically-conductive portions 441 is mounted into a respective one of the recesses 411. Besides, the electrically-conductive portions 421, 431, 441 are each mounted into a respective one of the recesses 411. The third power-input portion 443 is formed on an inner edge of the third ring piece 445 and extends upwardly. The third power-input portion 443 is electrically connected to one phase of the AC electrical power. In an embodiment of the present invention, the third power-input portion 443 may be electrically connected to the W-phase of the AC electrical power.

In addition, multiple step portions 415 are formed on an inner annular surface of the wire-bonding substrate 41. The step portions 415 form a stepped structure with step heights. The step portions 415 are annularly arranged on the inner annular surface of the wire-bonding substrate 41. The electrically-conductive rings 42, 43, 44 are each mounted on a respective one of the step portions 415.

In an embodiment of the present invention, because each one of the electrically-conductive portions 421, 431, 441 and the first pad body 271 of each one of the magnetic-pole solder pads 27 contact each other and protrude upwardly from the notch 413, to solder the electrically-conductive portions 421, 431, 441 with the magnetic-pole solder pads 27 is convenient.

Figure 7:
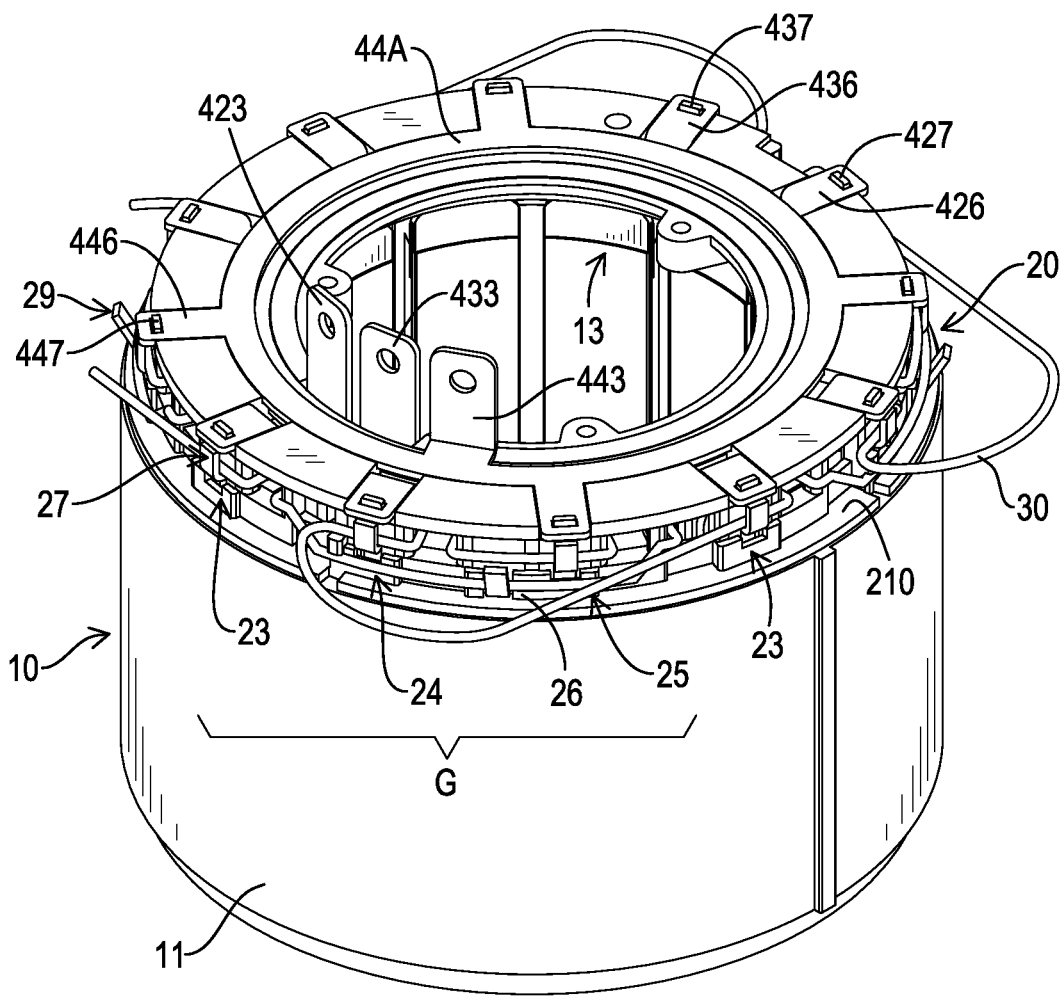
FIG. 7 is a perspective view of another embodiment of the stator of the present invention.
Figure 8:
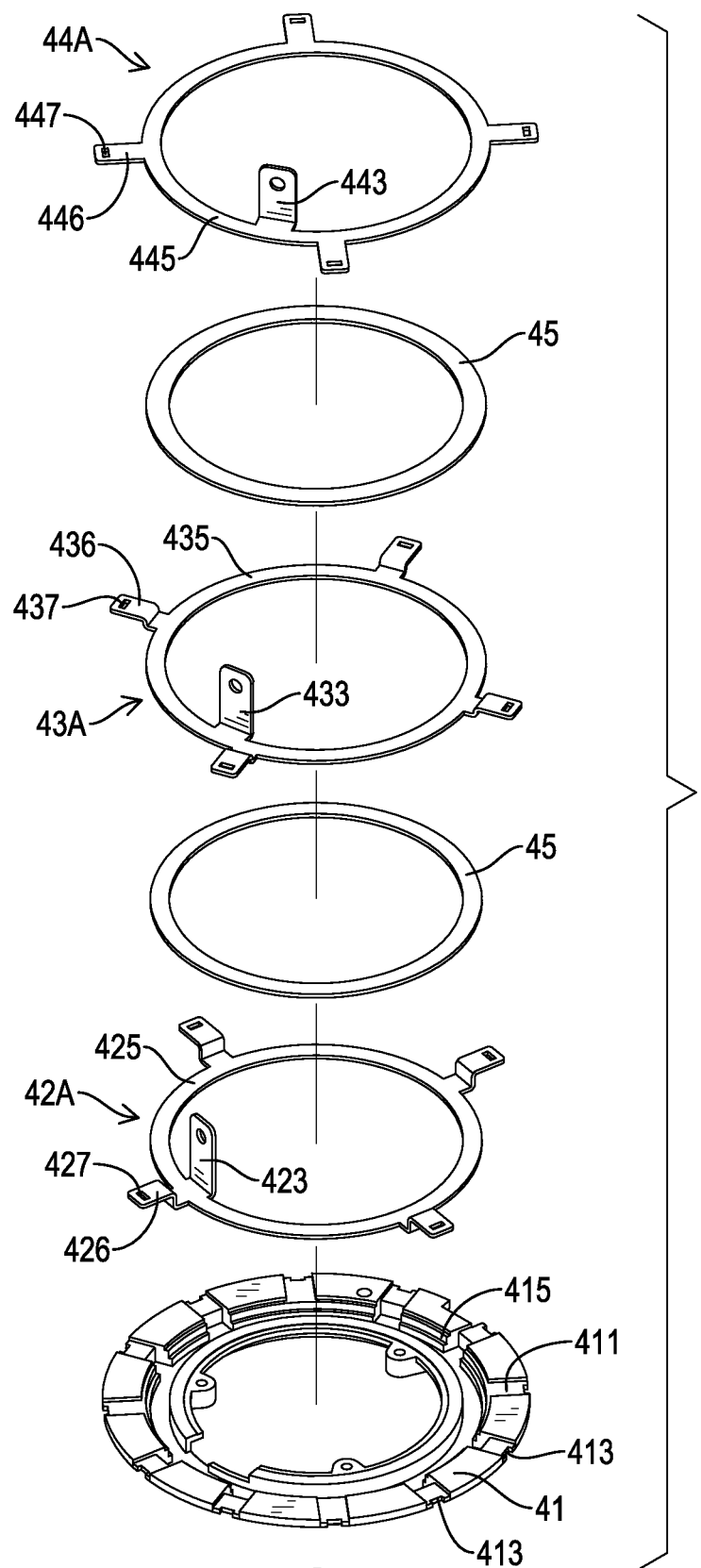
FIG. 8 is an exploded view of a second embodiment of the wire-bonding assembly of the stator of the present invention.
Figure 9:
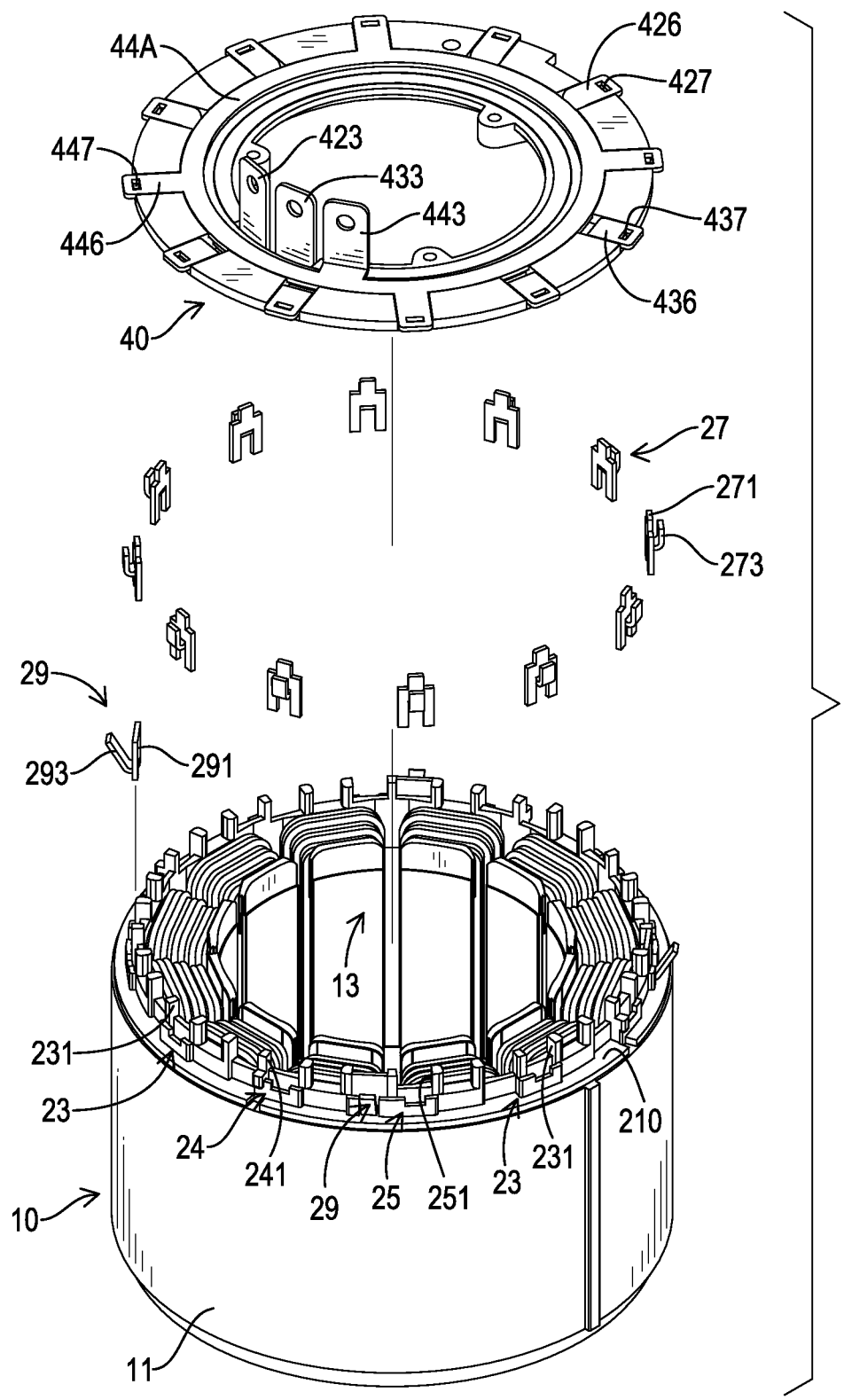
FIG. 9 is an exploded view of FIG. 7.

With reference to FIGS. 7-9, in a second embodiment of the wire-bonding assembly 40, compared with its first embodiment, the second embodiment of the wire-bonding assembly 40 has a difference that each one of the electrically-conductive portions of each one of the electrically-conductive rings radially and outwardly extends, wherein each one of the electrically-conductive portions has a hole.

Specifically, each first electrically-conductive portion 426 of the first electrically-conductive ring 42A has a hole 427. The first pad body 271 of the magnetic-pole solder pad 27 is inserted into the hole 427. The first electrically-conductive portion 426 is mounted into the recess 411. Preferably, the first pad body 271 of the magnetic-pole solder pad 27 is mounted through the notch 413 and the hole 427. The first power-input portion 423 may be electrically connected to the U-phase of the AC electrical power.

Each second electrically-conductive portion 436 of the second electrically-conductive ring 43A has a hole 437. The first pad body 271 of the magnetic-pole solder pad 27 is inserted into the hole 437. The second electrically-conductive portion 436 is mounted into the recess 411. Preferably, the first pad body 271 of the magnetic-pole solder pad 27 protrudes through the notch 413 and the hole 437. The second power-input portion 433 may be electrically connected to the V-phase of the AC electrical power.

Each third electrically-conductive portion 446 of the third electrically-conductive ring 44A has a hole 447. The first pad body 271 of the magnetic-pole solder pad 27 is inserted into the hole 447. The third electrically-conductive portion 446 is mounted into the recess 411. The electrically-conductive portions 426, 436, 446 are each inserted into a respective one of the recesses 411. Preferably, the first pad body 271 of the magnetic-pole solder pad 27 protrudes through the notch 413 and the hole 447. The third power-input portion 443 may be electrically connected to the W-phase of the AC electrical power.

Because the first pad bodies 271 of the magnetic-pole solder pads 27 protrude through the notches 413 and the holes 427, 437, 447, a space occupied by the wire-bonding assembly 40 is minimized. It is simple to connect the wire-bonding assembly 40 with the magnetic-pole solder pads 27.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stator of a brushless motor, the stator comprising:
   an iron core comprising:
      a core body having two open ends opposite to each other, and an exterior annular surface and an interior annular surface opposite to each other; and
      multiple stator poles mounted on the interior annular surface of the core body and spaced apart from each other;
   a bobbin mounted on one of the open ends of the core body and comprising:
      a substrate having an upper surface and a lower surface opposite to each other;

multiple pole covers formed on an inner annular surface of the bobbin;

at least three solder-pad connectors integratedly protruding from the upper surface of the substrate, wherein each one of the solder-pad connectors has a solder-pad-connector slot;

at least one neutral connector mounted on the upper surface of the substrate, wherein the least one neutral connector each has a neutral-connector slot;

at least three magnetic-pole solder pads respectively mounted in the solder-pad-connector slots of the solder-pad connectors; and at least one neutral solder pad mounted in the neutral-connector slot of the at least one neutral connector; and a winding assembly comprising at least one coil, wherein the winding assembly is formed by one wire wound on the multiple stator poles and the at least three solder-pad connectors; and the winding assembly is electrically connected to the at least three magnetic-pole solder pads and the at least one neutral solder pad;

wherein the at least three solder-pad connectors include a first connector, a second connector, and a third connector;

the first connector, the second connector, and the third connector are sequentially and circularly mounted on the upper surface of the substrate;

the first connector, the second connector, and the third connector each respectively have the magnetic-pole solder pad;

the first connector has a first winding pillar integratedly and upwardly protruding from the upper surface of the substrate; and after the winding assembly is electrically connected to the magnetic-pole solder pad in the first connector, and the winding assembly is wound on one of the stator poles that is corresponding to one of the pole covers; the winding assembly is then wound through the first winding pillar and the neutral connector and electrically connected to the neutral solder pad, and the winding assembly is then wound on another stator pole corresponding to another pole cover through a side of the third connector; the winding assembly is then wound through the third connector and electrically connected to the magnetic-pole solder pad in the third connector; the winding assembly is then wound through the neutral connector and electrically connected to the neutral solder pad; the winding assembly is then wound on another stator pole corresponding to another pole cover through a side of the neutral connector; and the winding assembly is wound through the second connector and then electrically connected to the magnetic-pole solder pad in the second connector.

2. The stator as claimed in claim 1, wherein the neutral connector is mounted beside the third connector.

3. The stator as claimed in claim 1 further comprising a wire-bonding assembly mounted on the upper surface of the substrate of the bobbin, wherein the wire-bonding assembly comprises a wire-bonding substrate and multiple electrically-conductive rings are mounted on the wire-bonding substrate; and an electrically-insulated ring piece is mounted between adjacent two of the electrically-conductive rings.

4. The stator as claimed in claim 3, wherein each one of the magnetic-pole solder pads has a first pad body and a first clamp portion; and the first clamp portion integratedly and upwardly protrudes from one side of the first pad body and is parallel to the first pad body.

5. The stator as claimed in claim 4, wherein each one of the electrically-conductive rings has a ring piece;

an electrically-conductive portion mounted on an outer edge of the ring piece and electrically connected to one of the magnetic-pole solder pads; and a power-input portion mounted on an inner edge of the ring piece, extending upwardly, and adapted to be electrically connected to one phase of an AC electrical power.

6. The stator as claimed in claim 5, wherein multiple notches are formed on a rim of the wire-bonding substrate; and the magnetic-pole solder pads are mounted through the notches respectively.

7. The stator as claimed in claim 6, wherein multiple step portions are formed on an inner annular surface of the wire-bonding substrate;

the step portions are annularly arranged on the inner annular surface of the wire-bonding substrate; and the electrically-conductive rings are each mounted on a respective one of the step portions.

8. The stator as claimed in claim 4, wherein the electrically-conductive rings include a first electrically-conductive ring;

multiple recesses are formed on an edge area of an upper surface of the wire-bonding substrate;

the first electrically-conductive ring is stacked on the wire-bonding substrate;

the first electrically-conductive ring comprises a first ring piece;

multiple first electrically-conductive portions formed on an outer edge of the first ring piece, wherein each one of the first electrically-conductive portions is electrically connected to a respective one of the magnetic-pole solder pads and mounted into a respective one of the recesses; and a first power-input portion formed on an inner edge of the first ring piece and extending upwardly and adapted to be electrically connected to a U-phase of an AC electrical power.

9. The stator as claimed in claim 8, wherein the electrically-conductive rings include a second electrically-conductive ring stacked on the first electrically-conductive ring through an electrically-insulated ring piece;

the second electrically-conductive ring comprises a second ring piece;

multiple second electrically-conductive portions formed on an outer edge of the second ring piece, wherein each one of the second electrically-conductive portions is electrically connected to a respective one of the magnetic-pole solder pads and mounted into a respective one of the recesses; and a second power-input portion formed on an inner edge of the second ring piece and extending upwardly and adapted to be electrically connected to a V-phase of the AC electrical power.

10. The stator as claimed in claim 9, wherein
the electrically-conductive rings include a third electrically-conductive ring stacked on the second electrically-conductive ring through another electrically-insulated ring piece;
the third electrically-conductive ring comprises
a third ring piece;
multiple third electrically-conductive portions formed on an outer edge of the third ring piece, wherein each one of the third electrically-conductive portions is electrically connected to a respective one of the magnetic-pole solder pads and mounted into a respective one of the recesses; and
a third power-input portion formed on an inner edge of the third ring piece and extending upwardly and adapted to be electrically connected to a W-phase of the AC electrical power.

11. The stator as claimed in claim 10, wherein the multiple first electrically-conductive portions, the multiple second electrically-conductive portions, and the multiple third electrically-conductive portions extend upwardly.

12. The stator as claimed in claim 11, wherein
the multiple first electrically-conductive portions, the multiple second electrically-conductive portions, and the multiple third electrically-conductive portions radially and outwardly extend;
each one of the multiple first electrically-conductive portions, the multiple second electrically-conductive portions, and the multiple third electrically-conductive portions has a hole; and
the first pad body of each one of the magnetic-pole solder pads is correspondingly inserted into the hole.

13. The stator as claimed in claim 12, wherein the at least one neutral solder pad has a second pad body and a second clamp portion integratedly and upwardly protrudes from one side of the second pad body.

* * * * *